United States Patent [19]

Burnham

[11] Patent Number: 4,524,983
[45] Date of Patent: Jun. 25, 1985

[54] COORDINATED LATHE CHUCK

[76] Inventor: J. Kellogg Burnham, P.O. Box 5601, Chula Vista, Calif. 92010-5601

[21] Appl. No.: 412,089

[22] Filed: Aug. 27, 1982

[51] Int. Cl.³ ............................................. B23B 31/16
[52] U.S. Cl. .................................... 279/110; 279/113; 279/116; 279/1 J
[58] Field of Search .................... 279/1 ME, 110, 112, 279/113, 114, 115, 116, 123, 1 J, 1 L, 6; 269/60, 125, 172

[56] References Cited

U.S. PATENT DOCUMENTS

| | | | |
|---|---|---|---|
| 295,229 | 3/1884 | Colton | 279/113 |
| 295,230 | 3/1884 | Colton | 279/123 |
| 1,033,547 | 7/1912 | Cornil | 279/113 |
| 1,635,481 | 7/1927 | Jorner | 279/113 |
| 3,097,860 | 7/1963 | Feldhoff | 279/113 |

Primary Examiner—William R. Briggs
Assistant Examiner—Daniel W. Howell
Attorney, Agent, or Firm—Anthony A. O'Brien

[57] ABSTRACT

A lathe chuck is disclosed which includes a plurality of gripping jaws actuated by jaw screws. The screws are rotatably mounted in openings extending radially from the central bore of the chuck. The screws include a central passageway having a spring-biased plunger therein which is adapted to be caused to project from the passageway, across the chuck bore, and into engagement with the passageway of a diametrically opposed jaw screws. With the two jaw screws thus interlocked, they may be rotated together by turning only one jaw screw, thereby moving the opposed, linked gripping jaws in unison an identical distance in one direction. The chuck also includes means for the microadjustment of each jaw position, means for interlocking the movements of selected jaws for simultaneous convergence, and means for immobilizing the gearing means and thereby those jaws then engaged; it provides for repetitive return of the coordinated jaws to a prior position, and automatic centering of round stock.

23 Claims, 5 Drawing Figures

COORDINATED LATHE CHUCK

BACKGROUND OF THE INVENTION

1. Field of the Invention

This invention relates to lathe chucks and in particular to a four-jaw lathe chuck having means for coordinating and interrelating the positions of various combinations of the jaws of a lathe chuck.

2. Description of the Prior Art

Conventional four-jaw lathe chucks require a relatively long setup time for the operator to center the workpiece. This setup time is a significant part of the total time for performing a lathing operation. With a conventional four-jaw chuck the setup of the workpiece is a complicated, inexact task. After measuring the initial off-center position of the workpiece, the appropriate jaw is tightened to move the workpiece inward a random distance at the most out of center point after the opposite jaw is backed off an equal distance. Thus, the workpiece is pressed closer to the center position. This process is repeated until the workpiece appears centered. Often however, the off center axis of the workpiece does not coincide with the axis of either pair of opposed jaws. This leads to a lengthy sequence of inconclusive approximations to adequately center a piece of material secured in the jaws for machining.

A further drawback of the conventional four-jaw chuck is the difficulty in repeating the centering operation just described when a substantial number of identical pieces are to be machined. Each successive piece has to be centered all over again.

For simple cylindrical workpieces the conventional three jaw "universal" chuck is much faster. The three jaws converge in unison and grip around workpiece in a centered position in relation to the chuck axis. While it is a relatively simple matter to center cylindrical workpieces, a three-jaw chuck is rarely used for other than cylindrically shaped workpieces. Further, the accuracy of three-jaw chucks is at a maximum when the chuck is new, since all three jaws are usually actuated by the same spiral thread on a chuck plate.

SUMMARY OF THE INVENTION

A lathe chuck includes a chuck body having a central bore and a plurality of openings disposed radially in relation to the bore, a jaw screw rotatably mounted in each of the openings, a gripping jaw associated with each of the jaw screws, first cooperating thread means joining each jaw screw with its respective gripping jaw for moving the gripping jaw radially, a locator screw mounted adjacent the jaw screw in each of the openings, second cooperating thread means joining the locater screw to the chuck body for moving the locater screw radially and a locater bracket extending between each jaw screw and its respective opening whereby radial movement of the locator screw causes the locater bracket to move the jaw screw in a radial movement.

It is an object of the present invention to provide a lathe chuck capable of rapidly centering a work piece of either cylindrical or odd shape.

It is another object of the invention to obviate the need for rotating a chuck and retracting one jaw which is holding the work piece past center position, before protracting the opposite jaw which must push the work farther towards center position.

A further object of the invention is to enable an operator, when he has measured the off-center position of the most off-center side of a workpiece, to keep that measurement continuously in sight as he advances a lathe chuck jaw pressing such work piece towards proper centered position while simultaneously retracting the chuck's opposite jaw.

A still further object of the invention is to permit the operator to move two opposing lathe chuck jaws simultaneously and oppositely, retracting the one and protracting the other equally in the same motion.

The present invention has another object in the provision of means for linking all or some of the jaw screws of a lathe chuck so that rotation of one produces simultaneous rotation of all or some jaw screws selectively in the same direction.

Another object of the invention is to provide means for engaging or disengaging each jaw screw of a lathe chuck at will in relation to the movement of one or more of the other jaw screws.

It is a feature of the invention to provide a precise positional corrective means for each jaw screw of a lathe chuck to permit readily modifying the axial position of its corresponding jaw by microadjustment.

It is another feature of the invention to enable all chuck jaws of a lathe chuck to be coordinated to equal radial positions relative to the chuck center axis.

It is a further feature of the invention to provide means to make all chuck jaws of a lathe chuck converge or diverge simultaneously by identical units of travel.

It is a still further feature of this invention to provide means to permit any one or more than one of the chuck jaws of a lathe chuck to have a different instantaneous radial position from the remainder while retaining the ability to diverge or converge simultaneously with and at the same rate of travel as the remaining chuck jaws.

Another feature of the invention is to enable chuck jaws of a lathe chuck to release a given non-cylindrical workpiece and then to seize a different workpiece having the same conformation and to reestablish immediately thereupon the precise centering position already found in the first given workpiece.

Yet another feature of the invention is to enable the multiple jaw chuck of a lathe to hold cylindrical workpieces on perfect center and to reestablish the same positioning without readjustment.

An advantage of the invention is that the varied capabilities set forth above do not alter the suitability of a lathe chuck for all uses in the customary practice prevailing for a conventional chuck.

Another advantage of the invention is that a lathe chuck provides all necessary chuck capabilities in a single chuck and thereby obviates the need for alternative chucks having disparate functions.

A further advantage of the invention is that a lathe chuck can be exactly adjusted to handle and quickly center cylindrical workpieces, regardless of the age or wear of the chuck.

These and other objects, features and advantages of the present invention will become readily apparent and understood in reference to the accompanying drawings and description of the preferred embodiments.

DESCRIPTION OF THE PREFERRED EMBODIMENT

Figure 1:
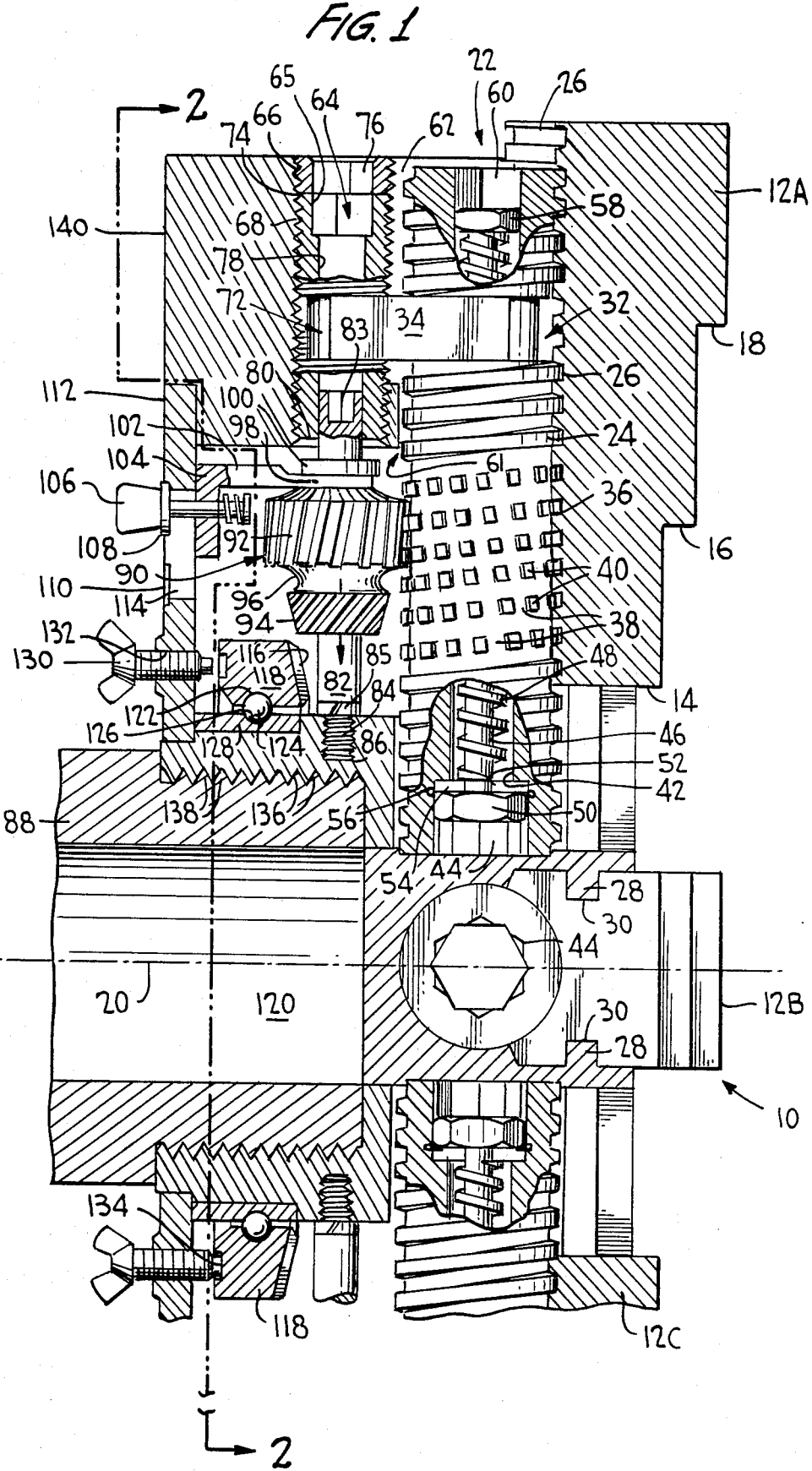
FIG. 1 is a cross section view of a lathe chuck (with parts broken away and parts removed) embodying with the invention.

As shown in FIG. 1, in cutaway cross-section, a lathe chuck 10 in accordance with the invention includes three chuck jaws 12A, 12B and 12C and a fourth chuck jaw (not shown) which lies in a plane perpendicular to the plane of jaws 12A and 12C and parallel to the plane of jaw 12B. Each of the jaws defines a quadrant of the chuck 10. For the purpose of illustration, only the quadrant of the chuck 10 including the jaw 12A will be described in reference to FIG. 1, it being understood that each of the four chuck quadrants are identical.

The jaw 12A includes three stepped engaging surfaces 14, 16 and 18 which allow the jaw 12A, in cooperation with the other jaws, to hold workpieces of various sizes and shapes. The jaw 12A can be moved radially inward and outward relative to a chuck center line 20 by means of a jaw screw 22 having buttress threads 24 which engage matching threads 26 formed in the rear face of the jaw 12A. In the following description, the outward, inward and top, bottom, respectively are used in reference to the center line 20, i.e. outward and top are away from or distant from the line 20 and inward and bottom are toward and adjacent to the line 20. Each of the jaws is held in true radial movement by radial jaw guides 28, shown for jaw 12B, which engage slots 30 in the lateral faces of each jaw.

To increase the ease of operation of the chuck 10, it may be provided with color-coding of the various jaw screws 22. For example, one jaw screw 22 could have a single red bar adjacent to it on the periphery of the chuck 10 while the diametrically opposed screw 22 has a pair of red bars. The other two, orthogonal jaw screws 22 could be marked with one and two blue bars, respectively.

Further, it is advantageous to include calibration markings on the chuck 10. For example, concentric circles (not shown) could be scribed on the front face of the chuck 10 with a radial separation related to that of stepped surfaces 14, 16 and 18. On each jaw lateral surface adjacent the surfaces 14, 16 and 18, there will be calibrated markings for conveniently reading the exact distance from the chuck center line relative to such concentric circles.

The jaw screw 22 includes a cylindrical neck area 32 of a diameter smaller than that of the roots of threads 24 which allows the screw 22 to be locked in a selected axial position by a locater bracket 34, to be described more fully hereinafter. The jaw screw 22 further includes a compound engagement area 36 wherein the threads 24 are "swept" by helical grooves 38 in a longitudinal, helical pattern. The grooves 38 isolate portions of the buttress threads 24 to form island threads 40 and island gear teeth 41. The grooves 38 do not interfere with the continuous mating of the island threads 40 and the matching threads 26 on the jaw 12A, i.e., the radial movement of the jaw 12A is not impeded by presence of the grooves 38 briefly interrupting buttress threads 24 on the screw 22.

The jaw screw 22 also includes a rectangular internal passage 42 extending the length of the screw 22. The passage 42 is occupied by an axially movable plunger 46 which extends most of the length of the passage 42 and is spring-loaded by a coil spring 48 encircling the plunger 46 over its length. The plunger 46 terminates at its inner end, adjacent the center line 20, in a hexagonal head nut 50 which is slidably movable in a shallow, twelve-point socket opening 44 which forms the inner end of passage 42. Alternatively, the nut 50 could be a splined head riding in a splined orifice 44, etc. An immovable collar 54, having a central aperture 52 through which the plunger 46 can pass, is held stationary in the socket 44 by means of a snap ring 56 which engages the wall of the socket 44. The outer end of the plunger 46 has the form of a square head 58 which, along with the plunger 46, is slidably movable in the passage 42. The square head 58 is sized such that rotation of the screw 22 causes the walls of the passage 42 to engage the head 58 and thereby transmit rotational movement to the plunger 46. It should be noted that the collar 54 provides an inner bearing and the head 58 provides an outer bearing area for the spring 48. Further, the outward movement of the plunger 46 is limited by the nut 50 which abuts the inner surface of the collar 54. The passage 42 terminates at the outer end of screw 22 in a square aperture 60 which serves as a tool engagement area for delivering rotational force to the jaw screw 22.

The entire assembly of the jaw-screw 22 is housed in a generally cylindrical bore 61 extending radially from adjacent the center line 20 to the outer rim of chuck 10. Bore 61 is open for its entire length on the front side of chuck 10 where the jaw-screw 22 engages the partial threads 26 of jaw 12 with its buttress threads 24. The upper portion of bore 61 is also open toward the rear of chuck 10 at an outward angle with respect to the center line 20 where it communicates with an opening 62. The opening 62 is occupied by the locater bracket 34.

Figure 5:
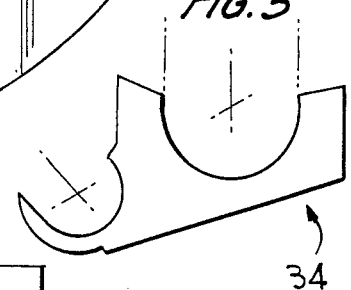
FIG. 5 is a plan view of a locater bracket of the invention.

Locater screw 64 includes a recessed neck area 72 which is engaged by locater bracket 34. The bracket 34 provides positive engagement between the locater screw 64 and the jaw-screw 22 such that, as will be explained hereinafter, the bracket 34 will move up and down in the opening 62 with the rotation of screw 64. The bracket 34 (FIGS. 3 and 5) supports and holds the jaw screw 22 in an axial sense, i.e., the bracket 34, along with the radial guides 28 on the jaw 12, provide the only positive support for the screw 22. Accordingly, it should be recognized that because of the positive linkage between the screw 64 and the screw 22 via the bracket 34, any axial movement of the screw 64 will result in an identical axial movement in the screw 22. This allows the screw 64 to serve as a microadjuster for screw 22 and hence jaw 12. Several degrees of angular rotation of screw 64 are required to move jaw 12 one one-thousandth of an inch inward or outward. Conversely, the bracket 34 allows any radial stress on the screw 22 caused by work loading of the jaw 12 to be borne primarily by the bracket 34 bearing against the walls of opening 62 and additionally by locater screw 64. The support provided by the walls of opening 62 is due to the backward-forward stress on jaw screw 22 and the sharp angle so formed with the lateral support afforded through locater bracket 34 by locater screw 64.

The locater screw 64 terminates at its outer end in a square socket head 65 which, when engaged by an appropriate tool, turns the screw 64. A counterlocking sleeve 76 is screwed into the threads 68 above the screw 64 and serves to lock the screw 64 in place when the sleeve 76 tightened. The screw 64 also includes a smooth cylindrical bore 78 therein extending from the end 74 to an inner end 80. The length of the screw 64 is less than that of the tapped bore in which it moves in order that regardless of the axial movement of the screw 64, the threads 66 on its periphery will always be intermeshed with the threads 68 on the chuck 10. This provides added radial rigidity to the jaw screw 22, transmitted via the bracket 34. The screwhole for locater screw 64 is longer than screw 64 such that sufficient inward and outward movement of the screw 64 is possible for the purpose of micro-adjustment of the jaw screw 22, its primary purpose.

An elongate, cylindrical spindle 82 has its outer end snugly supported in the bore 78 of screw 64 and its lower end stepped to a smaller, threaded end 84 which is tightly threaded into a tapped bore 86 in the hub of chuck 10 and locked in place by a lockwasher 89. A square socket 83 in the outer end of spindle 82 allows it to be tightly threaded in tapped bore 86.

A compound gear 90 having a central cylindrical bore (not shown) is slidably mounted on the spindle 82 by any appropriate means, for example, by needle bearings (not shown). The gear 90 has two distinct geared areas; a cylindrical portion 92 and a tapered portion 94, the portions 92 and 94 being isolated from one another by a toothless portion 96. The cylindrical geared portion 92 has gear teeth which are of a pitch adapted to mesh with the vertical surfaces 41 forming island gear teeth on the helical island threads 40 on the jaw-screw 22, which are defined by the helical grooves 38. The close proximity of the stationary spindle 82 to the jaw-screw 22 insures that the gear portion 92 is always engaged in island gear teeth 41; i.e., any rotation of the jaw-screw 22 is transmitted to compound gear 90 and vice-versa.

The compound gear 90 also includes a neck area 98 above the cylindrical geared portion 92. The neck area 98 terminates in an integral cap 100 having a diameter larger than that of the neck area 98. A yoke 102 extends from the rear of the chuck 10 and tightly engages the neck area 98 such that radial movement of the yoke 102 relative to the chuck center line 20 will cause the gear 90 to move along the spindle 82. The yoke 102 extends from a support plate 104 which is held against a rear closure plate 112 of the chuck 10 by a spring biased, two-position latch 106. The latch 106 is lockingly engaged in one of two detents 108 and 110 formed in the plate 112. The latch 106 is movable between the two detents 108 and 110 through a radial slot 114 in the plate 112.

The tapered gear portion 94 has spiral helical teeth which are adapted to engage hypoid teeth 116 on the foward face of a ring gear 118. The tapered gear portion 94 will engage the hypoid teeth 116 on the gear 118 only when the compound gear 90 is in its innermost position on spindle 82, i.e. when latch 106 is in detent 110. Regardless of the radial position of gear 90 however, the cylindrical portion 92 is in continuous meshing engagement with the island gear teeth 41 on jawscrew 22. The slight spiral helical angle of the teeth on gear portion 94 insures that merely by axial travel, except for needing perhaps a few degrees of rotation, the portion 94 will always engage or disengage the hypoid teeth 116 on ring gear 118.

The ring gear 118 is rotatably mounted for rolling circumferential movement around chuck bore 120 by an annular groove 122 on its inner circumference which serves as an external race for a plurality of ball bearings 124 that act to support ring gear 118 in a concentric, rotatable relationship with chuck bore 120. A corresponding annular groove 126 which acts as an internal race for the bearings 124 is formed in an annular support ring 128 mounted concentric with the chuck bore 120. Alternatively, the bearings 124 may be mounted in a cage (not shown) to space the balls. The support ring 128 is secured against movement by the closure plate 112. The only connection of ring gear 118 to the chuck body is via the bearings 124, thus the ring gear 118 can rotate freely relative to the chuck body whenever it is engaged by tapered portion 94 of a compound gear 90.

A wing screw 130 is provided adjacent the ring gear 118 which can prevent the gear 118 from rotating. The screw 130 is threaded into a tapped bore 132 in the rear closure plate 112 and is adapted to engage a recessed toothed portion 134 in the rear face of the gear 118. The rotational movement of the gear 118 can be stopped by tightening down on the screw 130 so that its end engages toothed portion 134. When ring gear 118 is locked via screw 130 and all the gears 90 are in mesh with gear 118, all of the screws 22 and their corresponding jaws 12 are immobilized, thus preventing any relative movement of these chuck components. While the locking means for the gear 118 is shown as a screw 130, it is to be noted that any suitable gear locking device would suffice. Further, the screw 130 need not be radially in line with one of the latches 106.

While only one quadrant of the chuck 10 has been described in reference to FIG. 1, it should be readily understood that the three other quadrants are identical thereto. The four quadrants together form a complete chuck 10 which is attached, as shown in FIG. 1, to a lathe headstock spindle nose 88 by threads 136 tightened on matching threads 138 on the nose 88.

Figure 2:
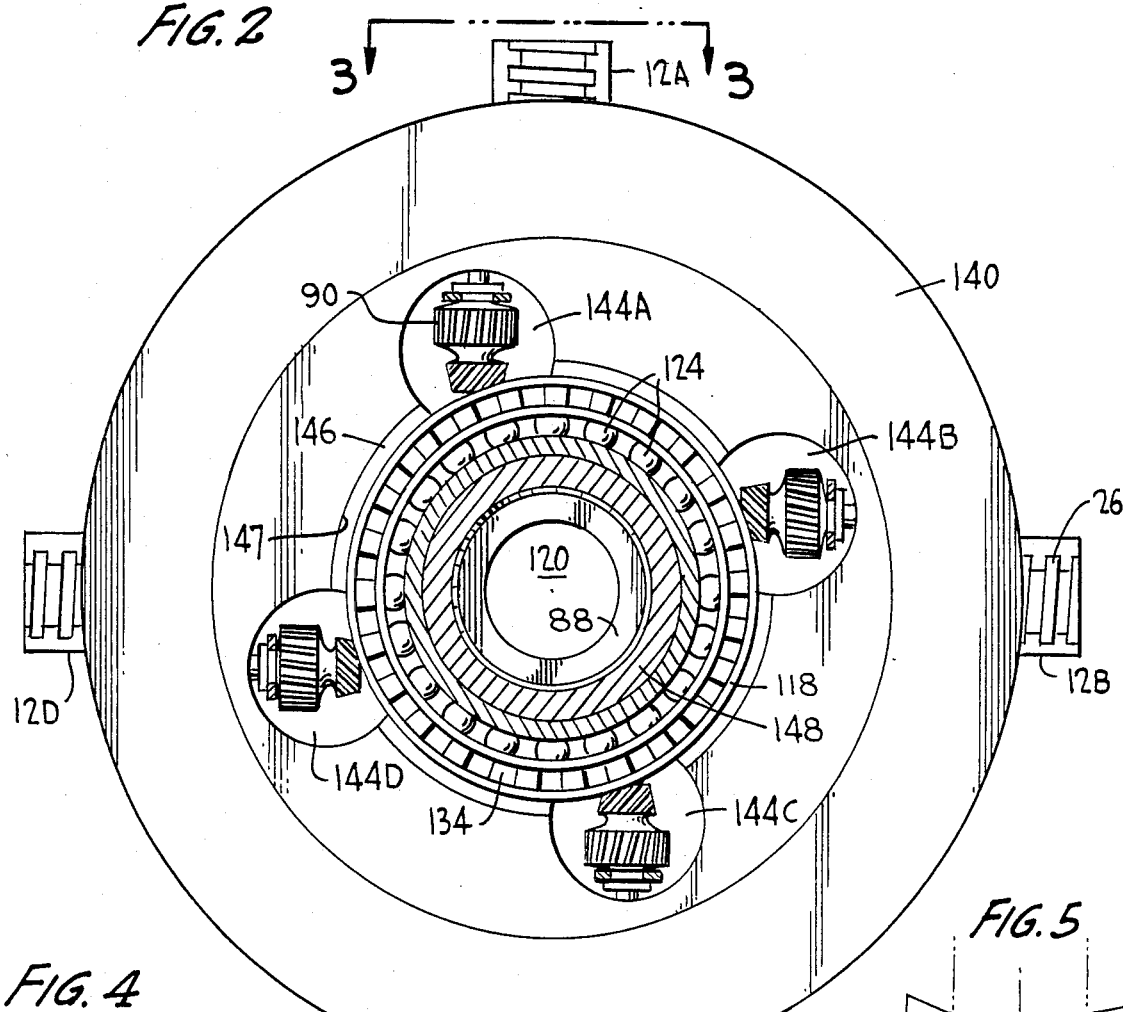
FIG. 2 is a cross section view taken along the offset line 2—2 of FIG. 1 but shown on a reduced scale.

Referring now to FIG. 2, which is taken along the line 2—2 of FIG. 1, there is shown a partially disassembled rear view, partially in section, of the chuck 10. The rear face 140 of chuck 10 surrounds an annular recessed portion 142 which is normally covered by the flat annular closure plate 112 which mounts flush with the rear face 140. The four jaws, designated as 12A, 12B, 12C and 12D are shown in their orthogonal positions around the periphery of the chuck 10. A locator screw 64 (not shown in FIG. 2) is associated with each of the jaw screws 22A, 22B, 22C and 22D (not shown in FIG. 2) and is countersunk, as explained in reference to FIG. 1, into the chuck 10 adjacent its respective jaw screw 22.

Removal of the closure plate 112 from the recessed portion 142, as shown in FIG. 2, reveals a portion of the internal structure of the chuck 10. Associated with and centered upon each locater screw 64 (not shown) there is a round bore chamber 144A, 144B, 144C and 144D respectively, which is drilled into the recessed portion 142 on the back of the chuck 10. The bores 144A, 144B, 144C and 144D form respective chambers within the chuck 10 to house each of the compound gears 90 and its related hardware. Each bore chamber 144 extends from the recessed portion 142 to a point at approximately the center axis of its associated jaw screw 22. The diameter of the bore chambers 144 is such that at its outwardmost point from the center line 20, it provides clearance above the cap 100 of gear 90 and at its innermost point it allows the tapered portion 94 of gear 90 to fully engage the ring gear 118. The bore chambers 144 are hence of such a size that the compound gear 90 can be moved radially along the spindle 82 to its two extreme positions and also can continuously engage its associated jaw screw 22 (FIG. 1).

The ring gear 118 is shown in FIG. 2 to include the toothed recess 134 which can be engaged by the wing screw 130 extending through the closure plate 112. The ring gear 118 is housed within an annular ring gear gallery 146 coaxial with chuck bore 120, cut into the body of the chuck 10. The inner diameter of ring gear gallery 146 is, as shown in FIG. 1, smaller than and lying within ring gear 118, and snugly engages annular support ring 128. An inward annular step is cut into the inner diameter of gallery 146 to accomodate support ring 128, with its annular groove 126 which serves as the inner race for ball bearings 124. The outer diameter of gallery 146 (see FIG. 2; not shown in FIG. 1) surrounds ring gear 118 with ample clearance. The width of the gallery 146 is large enough for clearance of the ring gear 118 on its forward face, as shown in FIG. 1.

In a complete four-jaw chuck, there are four bore chambers 144 symmetrically distributed about the back face of the chuck 10. Each of the bore chambers 144 is centered upon the axis of a respective one of the four spindles 82, which axis is coaxial with the axis of the four respective locater screws 64. This axis is parallel to the axis of the jaw screw 22 and is hence offset to the rear of the chuck 10 from the screw 22. When viewing from the rear of the chuck 10, as shown in FIG. 2, this offset also reveals the axis of each of the locater screws 64 to be slightly, angularly offset in a counterclockwise direction from their respectively, associated jaw screws 22. The purpose of this angular offet is to allow the locater screws 64 to be moved closer to the front of the chuck 10. This serves to allow more of hub portion 148 to contact lathe spindle nose 88 and also to decrese the thickness of the chuck 10. This same objective could be achieved by increasing the thickness of the body of chuck 10 and placing each jaw-screw 22 and its respective locater screw 64 in the same radial plane; however this would render the chuck 10 unduly large. For the sake of simplicity, the relationship wherein the screws 22 and 64 lie in the same radial plane is illustrated in FIG. 1. The preferred, offset relationship is shown in FIGS. 2 and 3.

Figure 3:
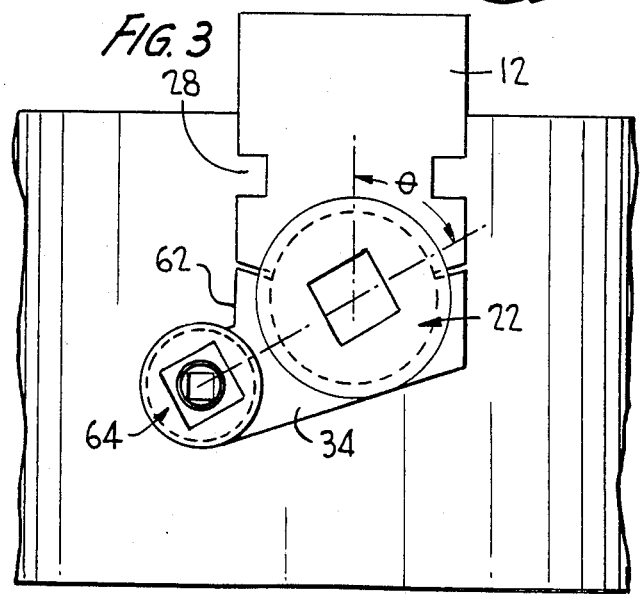
FIG. 3 is a plan view showing a portion of the lathe chuck as viewed from line 3—3 of FIG. 2.

Referring now to FIG.3, there is shown a top plan view of the chuck 10 as seen from the line 3—3 of FIG. 2. This top view better illustrates the offset relationship between the jaw screw 22 and the locater screw 64 where screw 64 is offset from the front-to-rear radial plane of the chuck 10 by an angle theta. In the preferred embodiment this angle may be 60 degrees or more. The jaw screw 22 is threaded onto the jaw 12 which is held in radial guide 28 and the locater screw 64 threaded in its bore with the locater bracket 34 extending between their neck areas in the opening 62. It should be recognized that the locater bracket 34 sits at a depth considerably below the surface of the chuck 10. The locater bracket 34 is better shown in FIG. 5 to include two arcuate portions which interconnect and engage the respective neck areas of jaw-screw 22 and locater screw 64.

Figure 4:
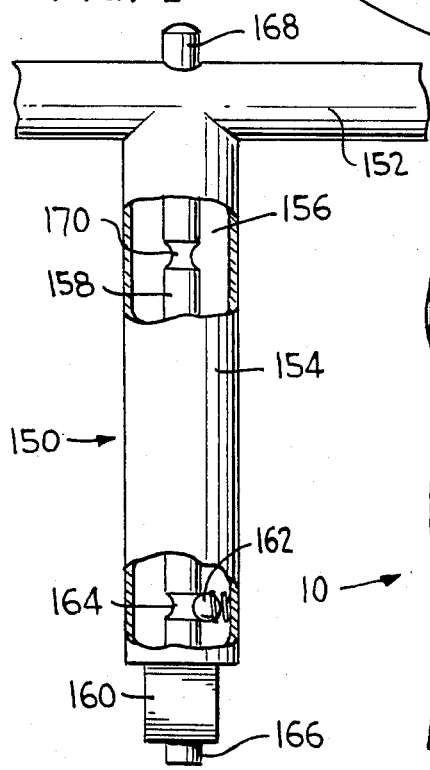
FIG. 4 is a partially broken away plan view of a T-wrench used in actuating the lathe chuck of the invention.

A T-wrench 150 for turning the screws 22, 64 and 76 of the chuck 10 is shown in FIG. 4 to include a handle portion 152 and a hollow stem portion 154 extending from the handle portion 152. The portions 152 and 154 can be cylindrical, as shown, or any other convenient shape. The stem portion 154 terminates in a square engagement portion 160 which is of size to easily engage in square aperture 60 on jaw screw 22, and square socket 65 in locater screw 64 and socket 77 of sleeve 76. The stem portion 154 also includes an internal passage 156 which houses a slidable extension rod 158. The rod 158 is held against movement in the passage 156 by any suitable means, such as by a spring-biased ball 162 attached to the stem 154 which engages a detent 164 on the rod 158. The rod 158 terminates in a square lower end 166 adjacent the end 160. The other, upper end 168 of rod 158 projects above the handle portion 152 such that by banging or rapping the end 168 against a surface, the detent 164 on the rod 158 will become dislodged from the ball 162. This allows the rod 158 to be extended downward through the passage 156 until the ball 162 engages a second detent 170 where the rod 158 is again held stationary. Conversely, to move the rod 158 back through the passage 156 from its extended position, the end 166 is rapped on a hard surface and the ball 162 will become dislodged from the detent 170, thus allowing the rod 158 to move freely until it is again locked in place when the ball 162 engages the detent 164.

The lathe chuck 10 of the present invention can be operated in three different modes; a conventional mode, a cross-over mode and a coordinated mode. It should be understood that the mode utilized by an operator in performing a particular lathing operation depends upon the shape of the workpiece, the number of identical workpieces to be lathed, etc. Further, each of the three modes may be utilized to a certain extent in any given workpiece. With reference now to FIGS. 1-4, the various modes of operation are described.

1. Conventional Mode

The chuck 10 can be operated in a conventional manner, exactly like other four-jaw chucks, by separately actuating each jaw 12 via its respective jaw screw 22. Each jaw 12 is separately converged on the workpiece, backed off and reconverged, etc., in the accustomed manner until the workpiece is centered. It should be noted that when the chuck 10 is operated in this conventional mode, the locater screw assemblies, the compound gear assemblies, etc. do not play a part in the centering of the workpiece.

2. Cross-Over Mode

The greatest utility of the cross-over mode is, for reasons which will become clear, in the centering of irregularly shaped workpieces. In this mode, the operator first tightens the four jaws 12 upon the workpiece so that it is supported and held while the chuck 10 is rotated. The operator then takes a direct measurement to determine in which direction and how far the workpiece must be moved in order for it to be centered. To begin the centering process, the operator rotates the chuck 10 until the most out of center point, and the jaw 12 holding that point, are positioned on top of the chuck 10. The chuck 10 is then in position for actuation of the jaws 12 to center the workpiece.

The T-wrench 150 is used in this operation in its fully extended configuration, i.e. the detent 170 is engaged by the ball 162 and accordingly the lower end 166 of rod 158 is extended from the square engagement portion 160 at the base of stem 154.

The operator guides the extended end 166 of the rod 158 inwardly through the square aperture 60 at the top end of the object or top jaw screw 22, which end 166 bears down on the square head 58 of plunger 46, thus moving the hexagonal head 50 at the bottom of plunger 46 toward the center line 20. Continued downward pressure on the plunger 46 from the T-wrench 150 causes the head 50 to move across the chuck bore 120 and into tight fitting relationship with the twelve-point socket opening 44 in the opposed jaw screw 22. The length of the T-wrench 150, when it is in its fully extended configuration, is such that when the head 50 is engaging the socket opening 44 in the opposed screw 22, the engagement portion 160 of T-wrench 150 is fitted into turning relationship with the square aperture 60 on the top of object screw 22. It should be pointed out that it may be necessary for the operator to rotate the screw 22 a small amount (a maximum of 30 degrees) in order to engage the head 50 in the opening 44. This rotation can be reduced by using splined head 50 in conjunction with a splined orifice 44. With the two opposed jaw screws 22 thus linked, rotation of the T-wrench 150 causes the two screws 22 to rotate in unison, moving one jaw 12 a distance toward the center line 20 and the opposite jaw 12 an equal distance away from the center line 20. The two jaws 12 move as if they were actuated by a single jaw screw, i.e. the workpiece is held in a manner similar to the holding action of two jaws of a clamp. The operator can keep his measurement continuously in easy view as he moves the workpiece down.

When the workpiece is in its centered position, the T-wrench 150 is withdrawn. This releases the plunger 46 and allows it to return to its normal position under the biasing force applied by coil spring 48. The operator may then rotate the chuck 10 ninety or two-hundred seventy degrees with the workpiece mounted and determine the remaining adjustment required for centering the workpiece along the other, perpendicular axis of the chuck 10. Having this off-center measurement in view, the operator inserts the extended T-wrench 150 into the new object jaw-screw 22 and interconnects the opposed jaw screws 22 and proceeds with the centering of the workpiece as before. At the completion of the centering process, the operator applies a final tightening turn to each jaw-screw before commencing working of the workpiece.

During the centering process in the cross-over mode, the workpiece is never released from seizure between the two actuated jaws 12. The transverse jaws 12 are not actuated, but provided lateral support to the workpiece as it moves. This procedure is followed however irregular the shape of the workpiece, since the shape is no obstacle. With the opposed jaws 12 moving in unison, it is not necessary as it is in conventional practice to back off one jaw before tightening the other. The conventional trial and error approach adds much non-productive time to the centering process. Since in the cross-over mode the jaws move in unison, it is not necessary to continually rotate the chuck back and forth to bring different jaws 12 to the top position on the chuck 10. Hence, an operator can set up an indicator gauge which will be in sight continually during the centering while accomplishing the centering in two steps.

3. Coordinated Mode

The coordinated mode of operation of the chuck 10 enables the operator to move all four jaws 12 in unison, either all converging on or all diverging from the chuck bore 120. It is particularly useful in centering successive workpieces of identical shape in a multi-piece lathing job since it is only necessary to center the first workpiece, with all successive pieces being centered identically with the first workpiece.

The coordinated mode can be utilized to quickly center both cylindrical and non-cylindrical workpieces. To prepare the chuck for centering cylindrical workpieces, the operator arrays all the jaws 12 at exactly the same distance from the center line 20. The jaws can be arrayed utilizing the calibrations on the jaw cheeks. Any microadjustment necessary can be made by a turn of the appropriate locater screw 64. Once the operator has all the jaws 12 an identical distance from center line 20, each of the four two position latches 106 is moved from its respective detent 108 to the adjacent detent 110. This brings the four compound gears 90 into a position such that the tapered gear portions 94 engage the ring gear 118. The rotation of one jaw screw 22 will now be transmitted through its associated compound gear 90 to ring gear 118. Ring gear 118 will in turn transmit that rotation to the other three compound gears 90 and therethrough to the other three jaw screws 22. The interconnection of all the jaw screws 22 via the gears 90 and ring gear 118 insures that the radial movement of one jaw 12 is identically matched in movement by the other jaws 12.

After the jaws 12 have been arrayed at identical distances from center line 20 and the latches 106 have been moved to the detents 110, the jaws 12 are all interlocked for simultaneous, identical convergence and divergence to and from center. Each of the jaw screws 22 is given a last tightening tug after the workpiece is secure to insure strong support of the workpiece during the lathing operation. It should be recognized that each of these last tugs is transmitted through the gear 118, thereby further tightening the other three jaws 12. Thus, various diameter cylindrical workpieces can be immediately and accurately centered without any readjustment of the chuck 10 being necessary. Further, since the chuck 10 is essentially recalibrated each time cylindrical workpieces are to be lathed, the precision of centering is independent of the age and amount of wear on the chuck.

The coordinated mode also has great utility in the working of non-cylindrical workpieces. For example, if a number of pieces having the same, non-cylindrical shape are to be lathed, it is only necessary to center the first workpiece and move latches 106 to lock in the exact array obtained; then each subsequent piece will be automatically centered by the chuck 10.

To operate the chuck 10 in this manner, the operator must first be sure that the gears 90 are not engaging the ring gear 118, i.e., that the latches 106 are in their outward positions in the detents 108. The operator then centers the first workpiece, using either the conventional mode or the cross-over mode. Once the workpiece is centered, each of the latches 106 is brought inward into the detent 110, thus "locking" the orientation of the jaws 12 into the chuck 10 via their indirect interconnection through the ring gear 118. After working, the jaws 12 can now be diverged to release the first workpiece and reconverged on the next workpiece in an identical distance relationship. As long as all of the jaws 12 are linked in coordination through the ring gear 118, this relationship will be the same. The apparent irregularity of position of the various jaws 12 holding different surfaces of the non-cylindrical workpiece in no way interferes with their precise coordination of travel.

Thus, it is clear that the lathe chuck of the present invention replaces with some advantage the conventional "universal" three-jaw chuck, and to still greater advantage the conventional four-jaw lathe chuck and of course chucks of other numbers of jaws. This obviates the need for changing chucks and for having chucks of various types around a shop.

While the description of the preferred embodiments is, for the sake of brevity, drawn to four-jaw chucks, it should be understood that any number of jaws could be used in accordance with the principles of the invention. However, to operate in the cross-over mode, it is necessary to have an even number of jaws.

Further, for the sake of simplicity and ease of understanding, the descriptions hereinbefore refer repeatedly to a lathe operator. However, it is within the scope of the invention to provide automatic means for powering and controlling the manipulation of the ring gear 118 and hence the jaw screws 22 or directly powering the jaw screws 22.

The invention is certainly also applicable to holding and gripping devices other than lathe chucks. For example, pipe gripping devices, drilling devices and airspace grippers.

Since many modifications, variations and changes in detail can be made to the disclosed embodiments of the invention, all matter described in the foregoing description and shown in the accompanying drawings should be interpreted as illustrative and not in a limiting sense.

What is claimed is:

1. A lathe chuck comprising a chuck body having a central bore and a plurality of openings disposed radially outward from the bore;
   a jaw screw rotatably mounted in each of said openings;
   a gripping jaw associated with each of said jaw screws;
   first cooperating thread means joining each jaw screw with its respective gripping jaw for moving the gripping jaw radially in relation to the bore;
   a locater screw mounted adjacent said jaw screw in each of said openings;
   second cooperating thread means joining said locater screw to said chuck body for moving the locater screw radially in relation to the bore;
   a locater bracket extending between each jaw screw and its respective locater screw in their respective opening whereby radial movement of the locater screw causes the locater bracket to move the jaw screw in a radial movement; and wherein each of said jaw screws includes a contoured internal passageway and a spring biased slidable plunger housed therein and wherein said passageway terminates adjacent the central bore in a contoured socket and said plunger terminates in a head adapted to be fitted in said socket.

2. A lathe chuck as claimed in claim 1 further comprising:
   a spindle associated with and extending parallel to each of said jaw screws;
   compound gear means slidably mounted for movement between first and second positions on each of said spindles;
   said compound gear means having first and second gear portions; and
   third cooperating gear tooth means joining the first gear portion of said compound gear means to its respective jaw screw whereby rotation of the jaw screw causes rotation of the compound gear means about the spindle.

3. A lathe chuck as claimed in claim 2 further comprising:
   ring gear means rotatably mounted in said chuck body for rotation about the central bore; and
   fourth cooperating thread means joining said ring gear means to said second gear portion when at least one of said compound gear means is in said second position whereby rotation of said second gear portion causes rotation in said ring gear means.

4. A lathe chuck as claimed in claim 3 wherein rotation of said ring gear means causes rotation in said second gear portion.

5. A lathe chuck as claimed in claim 3 further comprising:
   latch means for selectively maintaining said compound gear means in one of said first and second positions.

6. A lathe chuck as claimed in claim 3, 4 or 5 wherein said ring gear means interconnects at least two of said compound gear means.

7. A lathe chuck as claimed in claim 3, 4 or 5 further comprising:
   locking means for immobilizing said ring gear.

8. A lathe chuck as claimed in claim 1 wherein said body includes an even number of openings and said passageways are substantially the same length as said jaw screws and said plungers are substantially the same length as said passageways.

9. A lathe chuck as claimed in claim 1 or 8 wherein said plunger rectractably extends across the bore and engages the contoured socket in the passageway of said jaw screw diametrically opposite said plunger.

10. A lathe chuck as claimed in claim 9 wherein a tool forces said plunger across said bore and spring means biases the plunger against a force applied by the tool.

11. A lathe chuck as claimed in claim 1 wherein diametrically opposed jaw screws may be linkable by said plunger for unitary rotation by extending the head of one plunger into the socket of the opposed jaw screw causing their respective gripping jaws to protract in unison along their common axis in a common direction.

12. A lathe chuck as claimed in claim 1, 3, 4 or 5 wherein said body has four openings.

13. A lathe chuck as claimed in claim 2, 3 or 5 wherein said jaw screws include a square engagement portion at an end distance from said bore.

14. A lathe chuck as claimed in claim 2, 3 or 4 wherein said locater screws include a square aperture at an end distance from said bore.

15. A lathe chuck as claimed in claim 1 or 3 wherein each jaw screw includes a smooth cylindrical neck portion at the area of its engagement by the locater bracket.

16. A lathe chuck as claimed in claim 14 wherein each locater screw includes a smooth cylindrical neck portion at the area of its engagement by the locater bracket.

17. A lathe chuck as claimed in claim 2 wherein said jaw screw has indenting exterior threads thereon and wherein said third cooperating tooth means rotatably engaging said first gear portion of said compound gear to respective jaw screw comprises lengthwise grooving of said jaw screw indenting exterior threads thereof to provide remanent toothshaped island projections of generally rectangular shape.

18. A lathe chuck as claimed in claim 17 wherein said toothshaped island projections of said jaw screw engage meshing teeth of said compound gear by means of those surfaces of said remanent island projections that lie generally parallel to the axis of said jaw screw.

19. A lathe chuck as claimed in claim 17 wherein said toothshaped island projections of the said jaw screw engage cooperating thread means of said chuck jaws upon those surfaces of said remanent island projections which lie generally transverse to the axis of said jaw screw.

20. A lathe chuck as claimed in claim 2 wherein ring gear means are rotatably mounted in said chuck body and engage said second gear portions causing a selected plurality of respective jaw screws to rotate in coordination simultaneously in the same direction of rotation and thus to cause their respective gripping jaws to converge in unison at a common rate of advance.

21. A lathe chuck as claimed in claim 20 wherein the converging jaws are spaced at disparate distances from chuck center and converge at a uniform rate of travel.

22. A lathe chuck as claimed in claim 21 wherein common gearing means are linked to the converging jaws, and wherein immobilizing means lock said common gearing means whereby the converging jaws are locked against protraction.

23. A lathe chuck as claimed in claim 22 wherein an individual gripping jaw is released from the said immobilization means when its respective compound gear means is disengaged from said ring gear means.

* * * * *